United States Patent
Gladstone

(10) Patent No.: US 7,226,677 B2
(45) Date of Patent: Jun. 5, 2007

(54) ARRANGEMENT FOR SUPPLYING OZONE TO A FUEL CELL FOR A PASSENGER CAR

(76) Inventor: Ernest Gladstone, 5020 Henry Hudson Pkwy., Riverdale, NY (US) 10471

( * ) Notice: Subject to any disclaimer, the term of this patent is extended or adjusted under 35 U.S.C. 154(b) by 394 days.

(21) Appl. No.: 10/833,752

(22) Filed: Apr. 28, 2004

(65) Prior Publication Data

US 2004/0219404 A1    Nov. 4, 2004

Related U.S. Application Data

(60) Provisional application No. 60/466,975, filed on May 1, 2003.

(51) Int. Cl.
*H01M 8/06* (2006.01)
(52) U.S. Cl. ................................. 429/19; 422/186.07

(58) Field of Classification Search .................. 429/19
See application file for complete search history.

(56) References Cited

U.S. PATENT DOCUMENTS

| | | | |
|---|---|---|---|
| 4,323,810 A * | 4/1982 | Horstmann | 313/24 |
| 4,945,290 A * | 7/1990 | Eliasson et al. | 315/246 |
| 6,576,361 B1 * | 6/2003 | Barton | 429/25 |

FOREIGN PATENT DOCUMENTS

JP    2003-068347    *    3/2003

* cited by examiner

*Primary Examiner*—Susy Tsang-Foster
*Assistant Examiner*—Tony Chuo
(74) *Attorney, Agent, or Firm*—Kirschstein, et al.

(57) ABSTRACT

Ozone is made by exposure of oxygen to ultraviolet light and is supplied to a fuel cell to increase its efficiency.

2 Claims, 1 Drawing Sheet

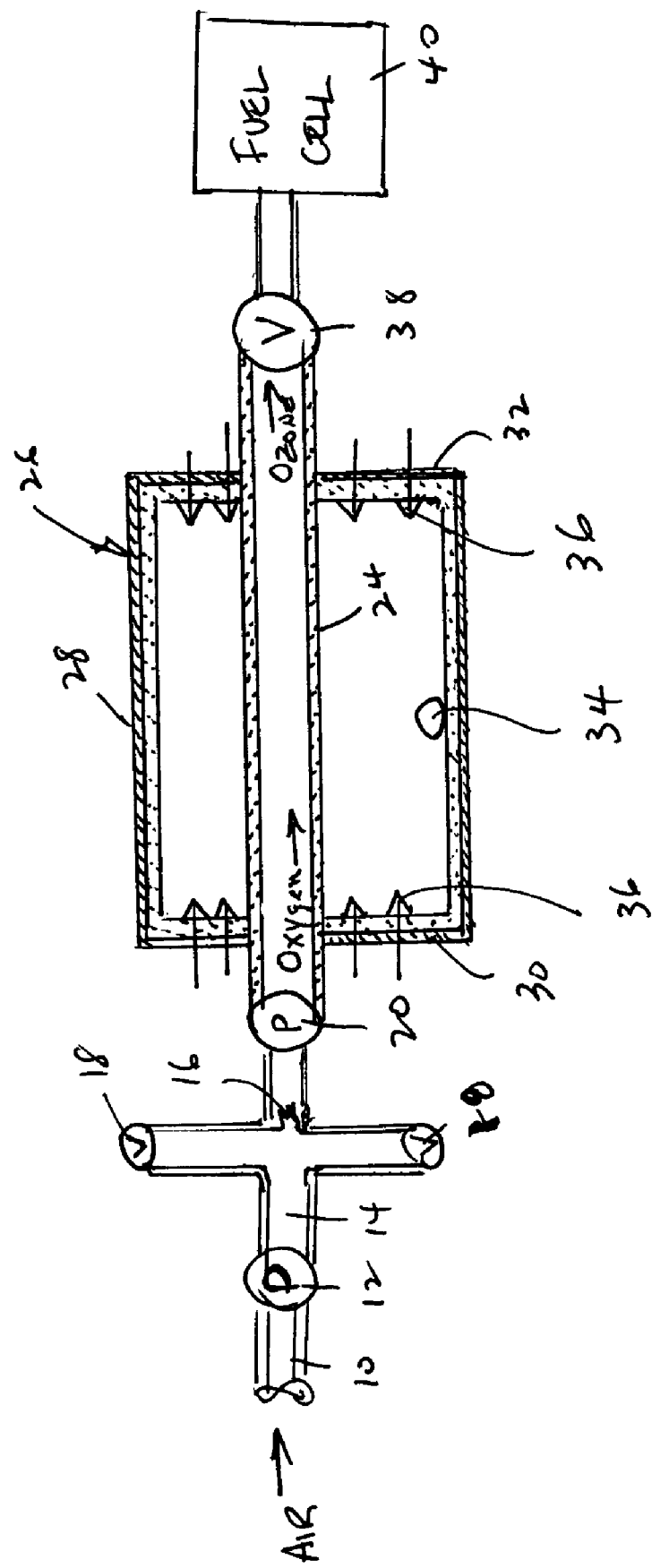

ARRANGEMENT FOR SUPPLYING OZONE TO A FUEL CELL FOR A PASSENGER CAR

CROSS REFERENCE TO RELATED APPLICATION

This application claims the priority of U.S. Provisional Patent Application Ser. No. 60/466,975, filed May 1, 2003.

BACKGROUND OF THE INVENTION

1. Field of the Invention

The present invention generally relates to improving fuel cell efficiency in a passenger car and, more particularly, to an arrangement for supplying ozone to the fuel cell.

2. Description of the Related Art

The automobile was invented and developed in the last century as an alternative means of individual transport to replace the various buggies and carts. The internal combustion engine, based on Herr Otto's design was chosen as the power train source but not because of its efficiency, simplicity of manufacture, durability, or low-weight to horsepower produced. In true fact, it had none of these virtues.

Many years of technological development were required to improve the engine's performance, durability and handling characteristics to bring it up to the standards which were then available in the electric motor, with a very long electric line attached.

The reason all that costly research and development work on the internal combustion engine was done by industry rather than developing a suitable automotive generator source for the better electric motor is not one of idiocy. The simple fact was that petroleum became a very important energy and feed stock source for civilization.

But petroleum's main problem was that is contained within it a then useless by-product, namely gasoline. Gasoline is about 40% of the refined product of petroleum. It could not be safely disposed of without damaging the environment or causing disastrous fires and explosions. The only means that industry had to use petroleum was to find a way to dispose of the gasoline byproduct safely.

The chosen course was the internal combustion engine on the automobile. Produced by the millions, the car freed industry of its gasoline disposal problem. The useless byproduct was safely burned up (exploded) in cars and provided what was actually then a cheap energy source for transport.

Besides the pollution problem the internal combustion engine poses today because of its increasing numbers, the greater part of the world cannot afford to follow the advanced world into the highly prized individual transport system based upon such costly technologies which makes the use of a cheap energy possible and less polluting individual transport systems based upon such costly technologies.

In relation to their per-capita incomes, the developing world cannot afford the expensive machinery required to safely utilize gasoline. Neither do they possess inexpensive and extensive distribution infrastructures necessary for the car's universal use in each country or the elaborate maintenance garages needed for its intensive internal use.

For the developing world, the automobile based upon both the internal combustion engine and petroleum is a way into endless poverty.

There is too much capital diversion necessary to possess, use and maintain fleets of internal combustion autos. There will be too much pollution for their fragile environs to survive because of the numbers of cars needed for the individual transport so much desired by many.

Much work has been done on fuel cells to eliminate gasoline dependency. Perhaps the best are in the low temperature alkaline fuel cells developed by K. Kordech at the Technical University at Graz, Austria. These fuel cells are available with a 50% efficiency operating at up to 4 atmospheres pressure over a 50° to 80° C. temperature range. Such hydrogen-air battery configurations of various arrays easily, in reasonable volumes, produce 28 KWH (about 40 HP) with a life expectancy of 5,000 hours. This power output is insufficient for automobile performance which would require in a light car at least 50 KWH (about 66 HP).

SUMMARY OF THE INVENTION

Object of the Invention

Accordingly, it is a general object of this invention to improve the efficiency of a fuel cell for a passenger car.

Features of the Invention

In keeping with the above objects and others which will become apparent hereinafter, one feature of the present invention resides, briefly stated, in a fuel cell arrangement having an inner chamber provided with an inlet and an outlet. Oxygen is admitted under pressure into the inlet. An outer chamber surrounds the inner chamber. The outer chamber has walls that reflect ultraviolet (UV) light, while the inner chamber has walls that are transmissive to UV light. UV light is generated inside the outer chamber as a byproduct of forming a mercury arc therein. The UV light converts the oxygen into ozone. The ozone is fed from the outlet to a fuel cell as an oxidant to increase its efficiency.

Ozone is a powerful oxidizing agent which is about double that of oxygen and produces an equal amount of diatomic oxygen which in addition is available for further oxidation. While the efficiency of such a fuel cell would drop to about 40% because of the energy required to generate the ozone and the life expectancy of the unit to drop about ⅔'s to 1600 hours because of the increasing energy impacts, a fuel cell inexpensively cruising at 115 HP at high performance speeds with little mechanical problems and no pollution can be achieved.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE depicts an arrangement for supplying ozone to a fuel cell in accordance with this invention.

DETAILED DESCRIPTION OF THE PREFERRED EMBODIMENTS

Air is admitted into an inlet 10 of a pump 12 for discharge as pressurized air (20 psi) through an outlet 14. The pressurized air is fed into an oxygenator having a filter 16 for only permitting oxygen therethrough. Alternatively, nitrogen filters 22 can be used to expel the nitrogen in the air. Exhaust valves 18 are periodically operated, e.g., to expel the nitrogen.

The oxygen-rich air is pumped by pump 20 into an inlet of a tubular inner chamber 24 whose wall is constituted of a material transmissive to ultraviolet (UV) light, e.g., glass.

As outer chamber 26 surrounds the inner chamber and has a cylindrical side wall 28 and axial end walls 30, 32. The walls bound an interior in which a drop of mercury 34 is received. The walls 28, 30, 32 are made of a material reflective to UV light, e.g., glass whose exterior surfaces are coated with a reflective, mirrored layer.

A plurality of electrodes 36 extends through the end walls and, when connected to a high voltage (e.g., 10,000 vDC), the electrodes form a mercury arc inside the outer chamber 26 and form UV light as a byproduct.

The UV light enters the inner chamber and converts the oxygen therein into ozone. The ozone is passed through a valve 38 into a fuel cell 40 for oxidation therein.

It will be understood that each of the elements described above, or two or more together, also may find a useful application in other types of constructions differing from the types described above.

While the invention has been illustrated and described as embodied in an improved fuel cell for the passenger car, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A fuel cell arrangement, comprising:
a) an elongated inner chamber having inner walls constituted of a material transmissive to ultraviolet (UV) light and extending along a longitudinal axis between an inlet and an outlet spaced apart along the axis;
b) a pump for feeding oxygen under pressure into the inlet of the inner chamber for passage towards the outlet of the inner chamber;
c) an outer chamber through which the inner chamber entirely extends, the outer chamber having outer walls spaced from and surrounding the inner walls in a circumferential direction about the axis, the outer walls being constituted of a material reflective to the UV light;
d) a quantity of mercury in the outer chamber;
e) an ozone generator for converting the oxygen inside the inner chamber into ozone for passage to the outlet of the inner chamber, by electrifying the mercury to generate the UV light that reflects off the outer walls of the outer chamber and passes through all the inner walls of the inner chamber; and
f) a fuel cell connected to the outlet of the inner chamber for receiving the ozone as an oxidant.

2. The arrangement of claim 1, wherein the outer walls of the outer chamber are covered with an exterior mirrored layer for reflecting the UV light to and through all the inner walls of the inner chamber.

\* \* \* \* \*